(12) United States Patent
Thompson et al.

(10) Patent No.: US 9,669,824 B2
(45) Date of Patent: Jun. 6, 2017

(54) METHODS AND SYSTEM FOR STARTING AN ENGINE

(71) Applicant: Ford Global Technologies, LLC, Dearborn, MI (US)

(72) Inventors: Scott James Thompson, Canton, MI (US); Bernard D. Nefcy, Novi, MI (US); Todd Mccullough, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/929,882

(22) Filed: Nov. 2, 2015

(65) Prior Publication Data

US 2017/0120896 A1    May 4, 2017

(51) Int. Cl.
| | |
|---|---|
| *B60W 10/08* | (2006.01) |
| *B60W 20/40* | (2016.01) |
| *B60W 10/02* | (2006.01) |
| *F02N 11/10* | (2006.01) |

(52) U.S. Cl.
CPC .......... *B60W 20/40* (2013.01); *B60W 10/023* (2013.01); *B60W 10/08* (2013.01); *F02N 11/103* (2013.01); *B60W 2510/0241* (2013.01); *B60W 2510/1015* (2013.01); *B60W 2540/10* (2013.01); *B60W 2710/027* (2013.01); *B60W 2710/083* (2013.01); *Y10S 903/906* (2013.01); *Y10S 903/93* (2013.01)

(58) Field of Classification Search
CPC ..... B60W 20/40; B60W 10/023; B60W 10/08
USPC ............ 701/22; 477/167, 86; 180/31, 10, 77
See application file for complete search history.

(56) References Cited

U.S. PATENT DOCUMENTS

| | | | |
|---|---|---|---|
| 7,370,715 B2 | 5/2008 | Colvin et al. | |
| 9,108,632 B2 | 8/2015 | Gibson et al. | |
| 9,156,469 B2 | 10/2015 | Gibson et al. | |
| 2013/0296132 A1* | 11/2013 | Doering ................... | B60K 6/48 477/86 |
| 2013/0296136 A1* | 11/2013 | Doering ................... | B60K 6/48 477/167 |
| 2014/0163802 A1 | 6/2014 | Tokai | |
| 2015/0198243 A1 | 7/2015 | Johri et al. | |

\* cited by examiner

*Primary Examiner* — Marthe Marc-Coleman
(74) *Attorney, Agent, or Firm* — David Kelley; McCoy Russell LLP

(57) ABSTRACT

Systems and methods for operating a driveline of a hybrid powertrain that includes a motor/generator and driveline disconnect clutch are described. The systems and methods may adjust a torque capacity of the driveline disconnect clutch during engine starting. Torque output from the motor/generator may also be adjusted during engine starting.

19 Claims, 4 Drawing Sheets

METHODS AND SYSTEM FOR STARTING AN ENGINE

FIELD

The present description relates to methods and a system for operating a powertrain of a hybrid vehicle. The methods and systems may be particularly useful for hybrid vehicles that include a driveline disconnect clutch.

BACKGROUND AND SUMMARY

An engine of a hybrid vehicle may be started via a motor that propels the hybrid vehicle. In particular, a driveline disconnect clutch may be closed to transfer torque from the motor to the engine at a same time the motor is propelling the vehicle. The driveline disconnect clutch may be slipped such that a first side of the driveline disconnect clutch rotates at a different speed than a second side of the driveline disconnect clutch to reduce the possibility of driveline torque disturbances. However, driveline disconnect clutch losses may increase, thereby reducing driveline efficiency if the driveline disconnect clutch slips for longer than is desired. Further, if the disconnect clutch torque capacity is greater or less than is desired, an objectionable change in wheel torque during engine starting may be produced by closing the driveline disconnect clutch. Therefore, it would be desirable to provide a way of operating a driveline disconnect clutch to start an engine that reduces disconnect clutch losses and provides a smooth engine start.

The inventors herein have recognized the above-mentioned issues and have developed an operating method for a vehicle, comprising: adjusting a torque capacity of a driveline disconnect clutch responsive to an estimated torque to rotate an engine at a desired cranking speed and an additional torque that is based on a torque converter impeller speed.

By adjusting driveline disconnect clutch torque capacity responsive to an estimated amount of torque to rotate an engine at a desired cranking speed and torque converter impeller speed, it may be possible to provide the technical result of reducing driveline disconnect clutch losses. In particular, the torque capacity of the driveline disconnect clutch may be increased to transfer more torque to the engine than to rotate the engine at a cranking speed so that the engine may start sooner, thereby reducing an amount of time the driveline disconnect clutch slips. Further, in some examples, the torque capacity of the driveline disconnect clutch may be reduced after being increased in response to increasing driver demand torque so that wheel torque may increase with increasing driver demand torque. In these ways, it may be possible to reduce driveline losses and provide smoother wheel torque progression.

The present description may provide several advantages. Specifically, the approach may reduce driveline losses. In addition, the approach may reduce driveline disconnect clutch degradation via reducing an amount of time the driveline disconnect clutch slips. Further, the approach may adjust for various driving conditions so that driveline disconnect clutch slipping may be appropriate for a variety of driving conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
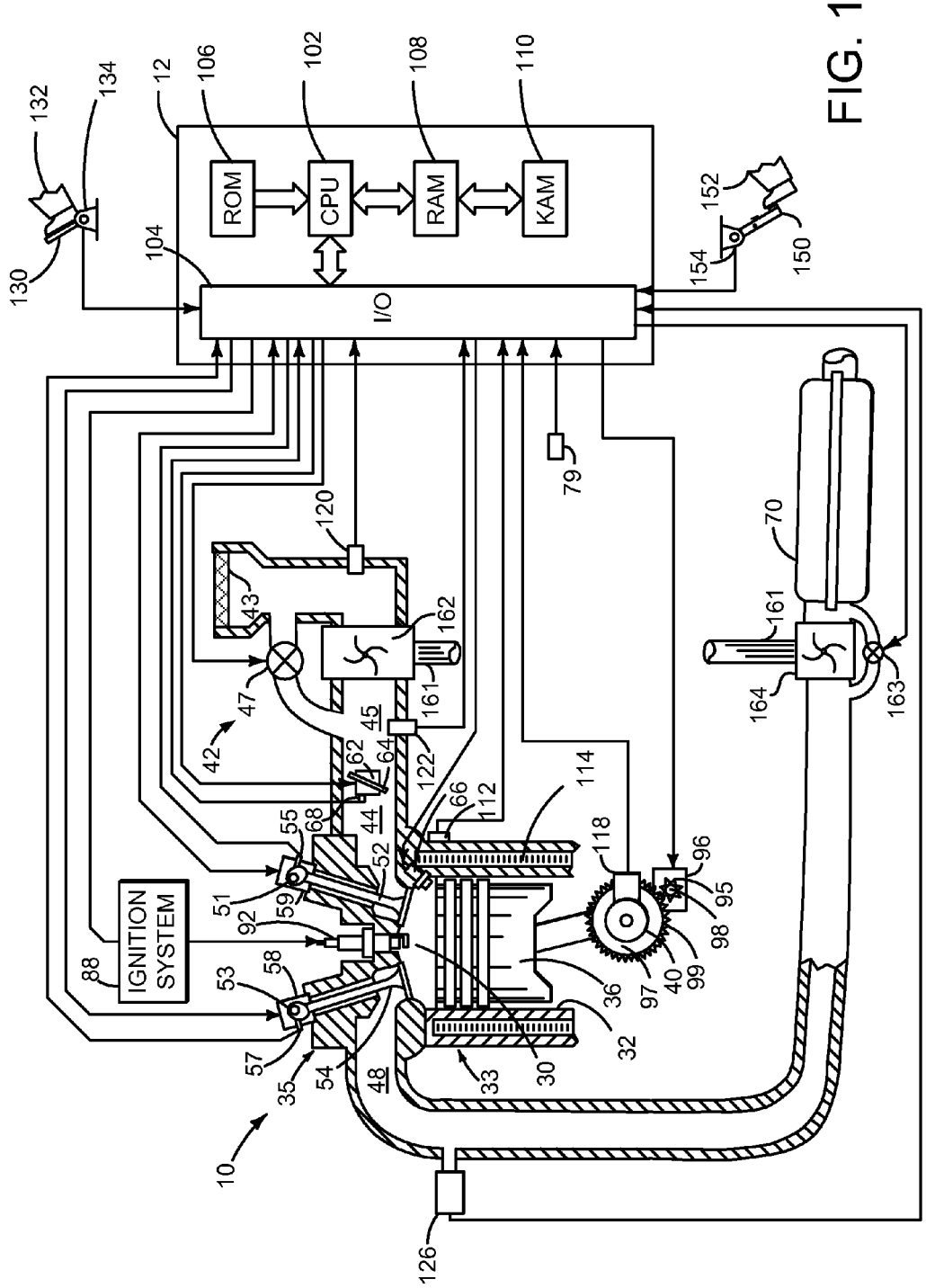
FIG. 1 is a schematic diagram of an engine.
Figure 2:
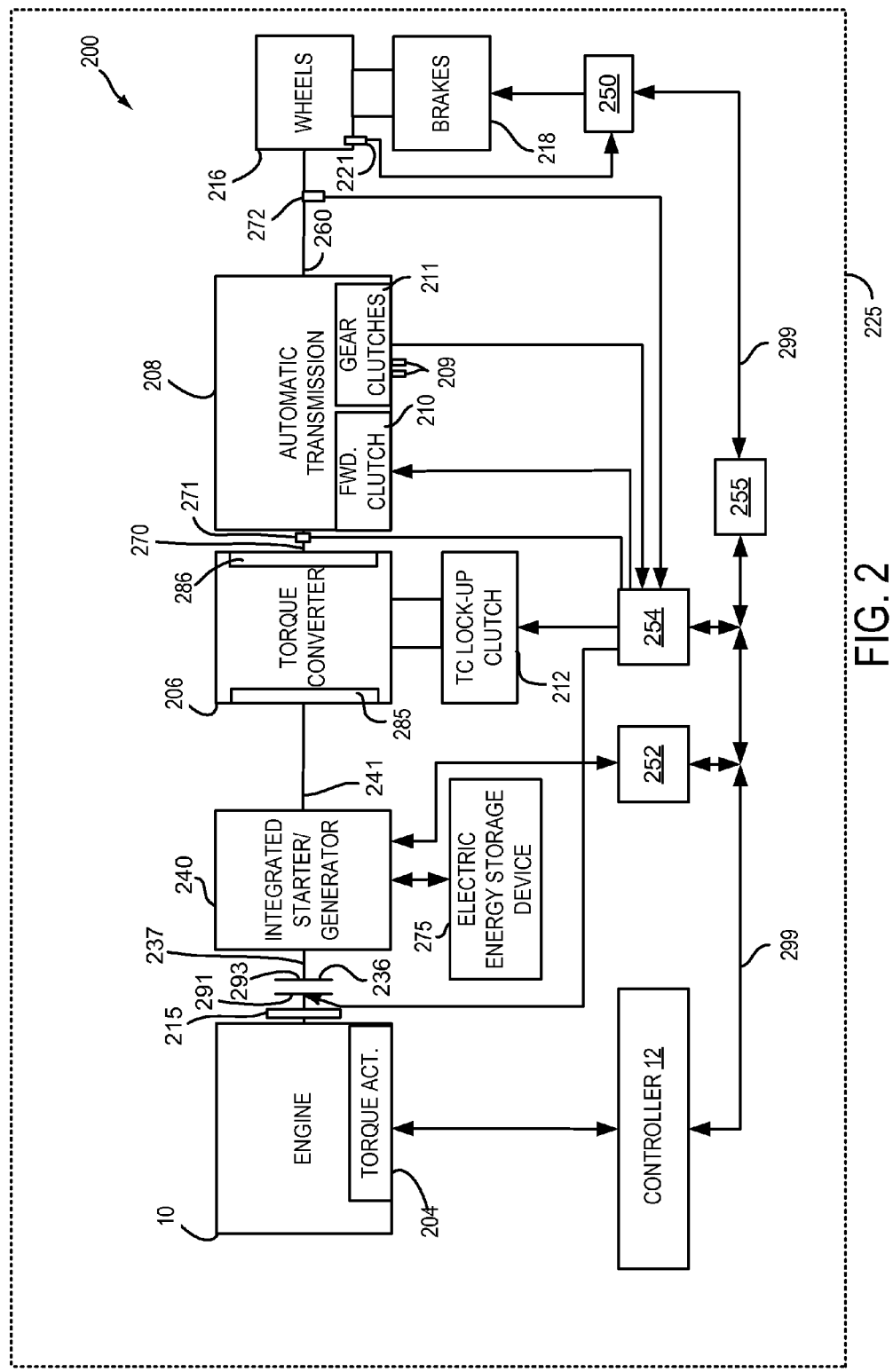
FIG. 2 is a schematic diagram of a hybrid vehicle powertrain.
Figure 3:
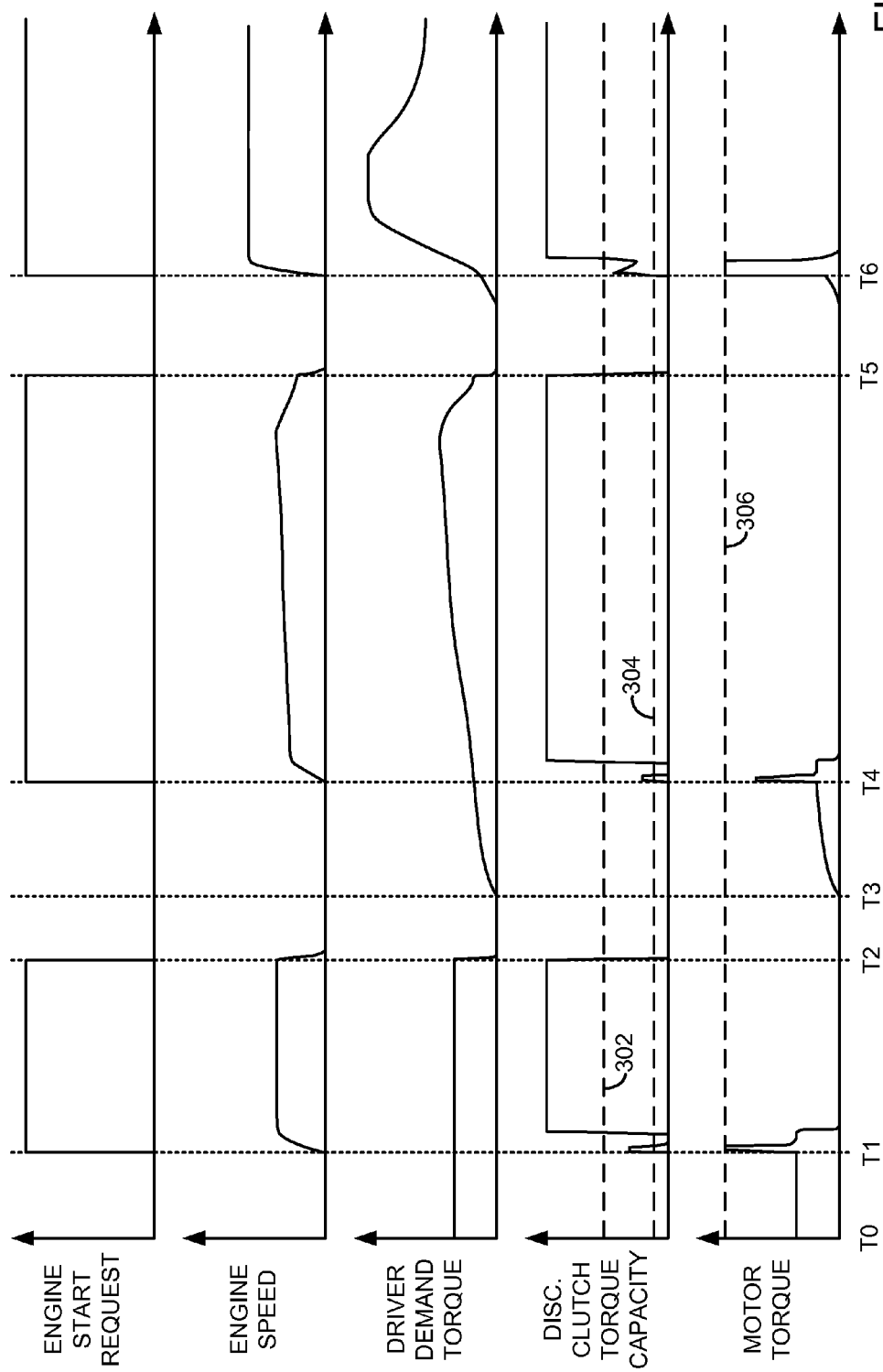
FIG. 3 shows an example operating sequence for operating a hybrid powertrain.

The present description is related to starting an engine that is included in a hybrid vehicle powertrain or driveline. The hybrid vehicle may include an engine as is shown in FIG. 1. The engine of FIG. 1 may be included in a powertrain as is shown in FIG. 2. The powertrain may operate as shown in the sequence of FIG. 3. The powertrain operates according to the method shown in FIG. 4.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed via sensor 79 for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain 200. The powertrain of FIG. 2 includes engine 10 shown in FIG. 1. Powertrain 200 is shown including vehicle system controller 255, engine controller 12, electric machine controller 252, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque to provide a desired rate of vehicle deceleration. The desired wheel torque may be provided by vehicle system controller requesting a first braking torque from electric machine controller 252 and a second braking torque from brake controller 250, the first and second torques providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250.

In this example, powertrain 200 may be powered by engine 10 and electric machine 240. In other examples, engine 10 may be omitted. Engine 10 may be started with an engine starting system shown in FIG. 1 or via integrated starter/generator (ISG) 240. ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

An engine output torque may be transmitted to a first side 291 of powertrain disconnect clutch 236 through dual mass flywheel 215. Disconnect clutch 236 may be electrically or hydraulically actuated. The second side 293 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 has a higher output torque capacity than starter 96 shown in FIG. 1. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque from an accelerator pedal or other device. Vehicle system controller 255 then allocates a fraction of the requested driver demand torque to the engine and the remaining fraction to the ISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271. Transmission controller 254 may receive transmission output shaft torque from torque sensor 272. Alternatively, sensor 272 may be a position sensor or torque and position sensors. If sensor 272 is a position sensor, controller 254 differentiates a position signal to determine transmission output shaft velocity. Transmission controller 254 may also differentiate transmission output shaft velocity to determine transmission output shaft acceleration.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

The system of FIGS. 1 and 2 provides for a driveline system, comprising: an engine; a motor/generator; a disconnect clutch positioned between the engine and the motor/generator; and a controller including executable instructions stored in non-transitory memory for supplying torque to the engine from the motor/generator via adjusting a torque capacity of the disconnect clutch responsive to a torque converter impeller speed and driveline disconnect clutch slip speed, and the torque capacity of the disconnect clutch reduced in response to driver demand torque after being adjusted responsive to the torque converter impeller speed and the driveline disconnect clutch slip speed. The system further comprises additional instructions to provide a minimum disconnect clutch torque capacity during engine cranking. The system includes where the minimum disconnect clutch torque capacity is based on an amount of torque to rotate the engine at a desired speed. The system includes where the engine is started via supplying torque to the engine from the motor/generator. The system further comprises additional instructions to adjust the torque capacity of the disconnect clutch responsive to an estimated torque to rotate an engine at a desired cranking speed.

Figure 4:
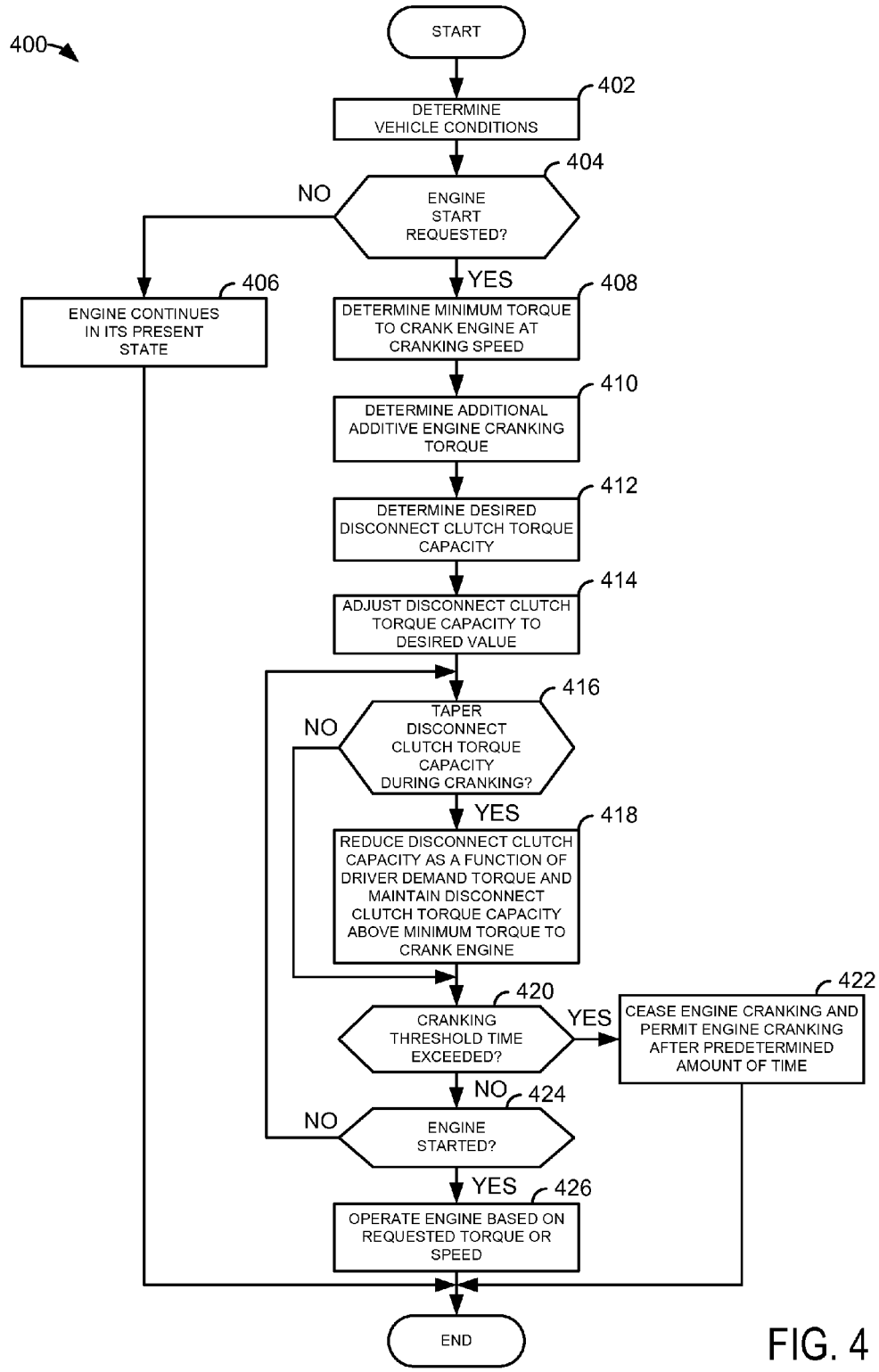
FIG. 4 shows an example method for starting an engine.

Referring now to FIG. 3, an example prophetic operating sequence according to the method of FIG. 4 is shown. The sequence of FIG. 3 may be provided by the system of FIGS. 1 and 2 according to the method of FIG. 4. The five plots are aligned in time and occur at a same time. Vertical dashed lines at times T0-T6 represent times of interest in the sequence.

The first plot from the top of FIG. 3 is a plot of an engine start request status bit in controller memory versus time. The engine is requested started and/or may be operating when the trace is at a higher level near the vertical axis arrow. The engine is not requested to be started and is not operating (e.g., not rotating and combusting air and fuel) when the trace is at a lower level near the horizontal axis. However, the engine may rotate between transitions. The vertical axis represents the engine start request state. The horizontal axis represents time and time increases from the left side of the figure to the right side of the figure.

The second plot from the top of FIG. 3 is a plot of engine speed versus time. The vertical axis represents engine speed and engine speed increases in the direction of the vertical axis arrow. The horizontal axis represents time and time increases from the left side of the figure to the right side of the figure.

The third plot from the top of FIG. 3 is a plot of driver demand torque versus time. The vertical axis represents driver demand torque and driver demand torque increases in the direction of the vertical axis arrow. The horizontal axis represents time and time increases from the left side of the figure to the right side of the figure. Driver demand torque may be determined based on empirically determined values in a function that is indexed via accelerator pedal position and vehicle speed.

The fourth plot from the top of FIG. 3 is a plot of driveline disconnect clutch torque capacity speed versus time. The vertical axis represents driveline disconnect clutch torque capacity and driveline disconnect clutch torque capacity increases in the direction of the vertical axis arrow. The horizontal axis represents time and time increases from the left side of the figure to the right side of the figure. Driveline disconnect clutch torque capacity is an amount of torque the driveline disconnect clutch may transfer irrespective of the torque applied to the driveline disconnect clutch. For example, 400 N-m may be applied to a driveline disconnect clutch, but the driveline disconnect clutch transfers only 200 N-m if the driveline disconnect clutch torque capacity is 200 N-m. The driveline disconnect clutch torque capacity may be varied from zero to a maximum threshold value when pressure of fluid in the driveline disconnect is at a threshold value. For example, torque capacity of a driveline disconnect clutch may be varied from 0 N-m when fully open to 500 N-m when fully closed with a threshold pressure being applied to the driveline disconnect clutch. Horizontal line 302 represents a maximum torque of a motor in the driveline, ISG 240 for example. Horizontal line 304 represents a threshold amount of torque for rotating an engine at a desired cranking speed such as 240 RPM. The level of horizontal line 304 may vary with engine operating conditions.

The fifth plot from the top of FIG. 3 is a plot of motor torque (e.g., ISG 240 torque) versus time. The vertical axis represents motor torque and motor torque increases in the direction of the vertical axis arrow. The horizontal axis represents time and time increases from the left side of the figure to the right side of the figure. Horizontal line 306 represents a maximum motor torque over all motor speeds.

At time T0, the engine start request is not asserted to indicate that the engine is not rotating and combusting air and fuel. The engine speed is also zero and the driver demand torque is at a lower level. The motor is providing the requested driver demand torque to the driveline and the driveline disconnect clutch torque capacity is zero indicating that the driveline disconnect clutch is open.

At time T1, the engine start request transitions from a lower level to a higher level to request that the engine start and operate. The engine start request may be provided in response to the engine being stopped for a predetermined amount of time, a low state of battery charge, or another condition. The engine is cranked and runs up to idle speed based on the method of FIG. 4. The driver demand torque remains at a same level as compared to time before time T1. The driveline disconnect clutch torque capacity is increased to a level greater than the threshold amount of torque for rotating an engine at the desired cranking speed 304. In particular, the driveline disconnect clutch is increased to a value that is a function of torque converter impeller speed and driveline disconnect clutch slip. Further, the driveline disconnect clutch torque capacity may be limited to a value less than maximum motor torque minus driver demand torque delivered via the motor. In this example, the torque converter impeller speed is a higher value (e.g., greater than 2000 RPM). Therefore, the driveline disconnect clutch torque capacity is increased to a higher level approaching level 302. The motor or ISG torque is increased to full motor torque; however, in other examples, motor torque may be increased to a level less than full or maximum motor torque.

Between time T1 and time T2, the engine start request remains asserted and the engine accelerates and begins combusting air and fuel. The driveline disconnect clutch torque capacity remains at a constant level and then is reduced in response to an actual total number of combustion events. The driveline disconnect clutch is open while the engine speed accelerates to torque converter impeller speed (not shown). The driveline disconnect clutch is closed in response to engine speed being within a threshold speed of torque converter impeller speed. The motor torque is decreased as the driveline disconnect clutch capacity is reduced in response to the engine running up as indicated by the number of combustion events since the most recent engine stop. The motor torque is reduced to the level of the driver demand torque and then it is further reduced in response to the driveline disconnect clutch fully closing and engine torque providing the driver demand torque. The motor torque is zero while engine torque provides the driver demand torque.

At time T2, the engine start request status bit transitions from a higher level to a lower level to indicate that engine rotation is stopping or being stopped. In this example, the engine start request status bit transitions to a lower level in response to the reduction in driver demand torque. The engine speed moves to zero as the engine is stopped. The driveline disconnect clutch also opens in response to the decrease in driver demand torque. The motor torque remains low in response to the low driver demand torque.

At time T3, the driver (not shown) increases the driver demand torque. The motor torque is increased in response to the increase in driver demand torque. The engine start request bit remains at a lower level and the engine remains stopped. The driveline disconnect clutch is open.

At time T4, the engine restart request transitions to a higher level to request engine starting and operation. The engine start request may be made in response to the engine being stopped for a predetermined amount of time, a low state of battery charge, or another condition. The engine is cranked and runs up to idle speed based on the method of FIG. 4. The driver demand torque increases at a slow rate as compared to time before time T4. The driveline disconnect clutch torque capacity is increased to a level greater than the threshold amount of torque for rotating an engine at the desired cranking speed 304, but less than the level at time T1. Again, the driveline disconnect clutch is increased to a value that is a function of torque converter impeller speed and driveline disconnect clutch slip. However, in this example, the torque converter impeller speed is a lower value (e.g., less than 2000 RPM). Consequently, the driveline disconnect clutch torque capacity is less than at time T1. Additionally, the driveline disconnect clutch torque capacity is limited to a value less than maximum motor torque minus driver demand torque delivered via the motor. The motor or ISG torque is increased to less than full motor torque since higher torque is not needed to crank the engine or accelerate the vehicle in response to the driver demand torque.

Between time T4 and time T5, the engine start request remains asserted and the engine accelerates and begins combusting air and fuel. The driveline disconnect clutch torque capacity remains at a constant level and then is reduced in response to an actual total number of combustion events. The driveline disconnect clutch is open while the engine speed accelerates to torque converter impeller speed (not shown). The driveline disconnect clutch is closed in response to engine speed being within a threshold speed of torque converter impeller speed. The motor torque is decreased as the driveline disconnect clutch capacity is reduced in response to the engine running up as indicated by the number of combustion events since the most recent engine stop. The motor torque is reduced to the level of the driver demand torque and then it is further reduced in response to the driveline disconnect clutch fully closing and engine torque providing the driver demand torque. The motor torque is zero while engine torque provides the driver demand torque.

At time T5, the engine start request status bit transitions from a higher level to a lower level to indicate that engine rotation is stopping or being stopped. In this example, the engine start request status bit transitions to a lower level in response to the reduction in driver demand torque. The engine speed moves to zero as the engine is stopped. The driveline disconnect clutch also opens in response to the decrease in driver demand torque. The motor torque remains low in response to the low driver demand torque.

Between time T5 and time T6, shortly before time T6, the driver demand torque increases and motor torque increases in response to the driver demand torque increase. The engine start request remains low and the engine remains stopped. The driveline disconnect clutch also remains open.

At time T6, the engine start request transitions from a lower level to a higher level to request that the engine start and operate. The engine start request may be provided in response to the engine being stopped for a predetermined amount of time, a low state of battery charge, or another condition. The engine is cranked and runs up to idle speed based on the method of FIG. 4. The driver demand torque continues to increase during engine cranking and engine run-up to idle speed. The driveline disconnect clutch torque capacity is increased to a level greater than the threshold amount of torque for rotating an engine at the desired cranking speed 304. Specifically, the driveline disconnect clutch is increased to a value that is a function of torque converter impeller speed and driveline disconnect clutch slip. Further, the driveline disconnect clutch torque capacity is limited to a value less than maximum motor torque minus driver demand torque delivered via the motor, and the driveline disconnect clutch torque capacity is decreased after initially increasing so that torque delivered to the vehicle wheels increases. In this example, the decrease in driveline disconnect clutch torque capacity is based on or in response to the rate of increase in driver demand torque. The motor or ISG torque is increased to full motor torque; however, in other examples, motor torque may be increased to a level less than full or maximum motor torque. The driveline disconnect clutch is fully closed after engine speed is within a threshold speed of torque converter impeller speed. The ISG torque is decreased after the engine is started and the driveline disconnect clutch is fully closed.

In this way, torque capacity of the driveline disconnect clutch may be adjusted to reduce energy consumption of the driveline disconnect clutch. Further, the driveline disconnect clutch torque capacity may be decreased as a function of driver demand torque increase to improve torque delivery to vehicle wheels during a time between engine cranking and engine speed reaching torque converter impeller speed.

Referring now to FIG. 4, a method for operating a vehicle powertrain is shown. At least portions of method 400 may be implemented as executable controller instructions stored in non-transitory memory. Additionally, portions of method 400 may be actions taken in the physical world to transform an operating state of an actuator or device, such as a torque capacity of a driveline disconnect clutch and torque of a motor/generator. In the description of FIG. 4, "the vehicle" refers to the vehicle in which transmission shifting is controlled (e.g., vehicle 225 of FIG. 2).

At 402, method 400 determines vehicle conditions. Vehicle conditions may include but are not limited to vehicle speed, driver demand torque, transmission input shaft speed, battery state of charge, accelerator pedal position, and brake pedal position. Vehicle conditions may be determined via a controller querying its inputs. In one example, driver demand torque or desired driver demand torque may be determined via a position of an accelerator pedal and vehicle speed. Method 400 proceeds to 404 after conditions are determined.

At 404, method 400 judges if an engine start is requested. An engine start may be requested in response to battery state of charge, driver demand torque greater than a threshold, cabin heat request, or other condition. If method 400 judges an engine start request is present, the answer is yes and method 400 proceeds to 408. Otherwise, the answer is no and method 400 proceeds to 406.

At 406, method 400 continues to operate or not operate the engine its present state. For example, if the engine is stopped, it remains stopped. If the engine is rotating and combusting air and fuel, the engine remains operating. Further, the engine torque and speed may be adjusted in response to operating conditions if the engine is rotating and combusting air and fuel. Method 400 proceeds to exit after 406.

At 408, method 400 determines a minimum torque to rotate the engine at a desired engine cranking speed (e.g., 250 RPM, a minimum cranking torque). In one example, the desired engine cranking speed is less than engine idle speed. The minimum cranking torque may be empirically determined and stored in a table or function that is indexed via an engine temperature, barometric pressure, and a time since the engine was most recently stopped rotating. The minimum cranking torque may be determined via indexing the table or function via engine temperature, barometric pressure, and time since most recent engine stop to determine the minimum cranking torque. Higher barometric pressures may increase engine cranking torque and lower barometric pressures may lower engine cranking torque. Method 400 proceeds to 410 after the minimum cranking torque is determined.

At 410, method 400 determines an additional additive torque to crank the engine or to apply to the engine until a predetermined number of engine combustion events have occurred. In one example, the additive engine cranking torque is empirically determined and saved to a table or function in memory. Values in the table may be based on torque converter impeller speed and driveline disconnect clutch slip speed (e.g., a speed difference between one side of the driveline disconnect clutch and speed of the other side of the driveline disconnect clutch). In one example, the additive engine cranking torque may be increased as torque converter impeller speed increases. Further, additive engine cranking torque may be increased as driveline disconnect clutch slip speed decreases. The additive engine cranking torque may vary with time since the most recent engine stop. Method 400 proceeds 412 after the additive engine cranking torque is determined.

At 412, method 400 determines a desired driveline disconnect clutch torque capacity (e.g., an amount of torque the driveline disconnect clutch may transfer). The desired driveline disconnect clutch torque capacity is the minimum torque to rotate the engine at a desired engine cranking speed determined at 408 plus the additive engine cranking torque determined at 410. The motor or ISG torque may be determined based on the following equation Tm=lim(mincrk+addtor+ddtor) where Tm is motor torque, lim is a function that limits motor torque to the motor's maximum torque at the present motor speed, mincrk is the minimum engine cranking torque determined at 408, addtor is the additive torque determined at 410, and ddtor is the driver demand torque. Method 400 proceeds to 414 after the desired driveline disconnect clutch torque capacity is determined.

At 414, method 400 adjusts the driveline disconnect clutch torque capacity via supplying pressurized fluid or electrical current to the driveline disconnect clutch. The driveline disconnect clutch torque capacity is adjusted to the value determined at 412. The ISG torque may also be adjusted at 414. The ISG torque may be increased or decreased by increasing or decreasing current supplied to the ISG. Method 400 proceeds to 416 after adjusting driveline disconnect clutch torque capacity and/or motor/generator torque.

At 416, method 400 judges whether or not to taper or adjust driveline disconnect clutch torque capacity during engine cranking and engine run-up before engine speed is at or above a threshold speed (e.g., engine idle speed). In one example, method 400 may judge to reduce driveline disconnect clutch torque capacity as time since a most recent engine stop increases in response to a rate of driver demand torque increasing by more than a threshold amount. Otherwise, the answer is no and the driveline disconnect clutch torque capacity is maintained at the value it is adjusted to at 414. In this way, wheel torque may be increased as cranking time increases so that a driver experiences expected vehicle acceleration since reducing driveline disconnect clutch torque capacity can increase the amount of motor torque delivered to vehicle wheels. If method 400 judges to taper or adjust driveline disconnect clutch torque capacity, the answer is yes and method 400 proceeds to 418. Otherwise, the answer is no and method 400 proceeds to 420.

At 418, method 400 reduces the driveline disconnect clutch torque capacity as a function of driver demand torque. Method 400 also maintains driveline disconnect clutch torque capacity to a torque greater than the minimum engine cranking torque determined at 408. The driveline disconnect clutch torque capacity may be reduced to the minimum engine cranking torque or a greater torque, but not a lower torque, to ensure there is sufficient torque to crank the engine. In one example, the driveline disconnect clutch torque capacity may be reduced based on a rate of increase in driver demand torque. For example, if driver demand torque increases at a higher rate, driveline disconnect clutch torque capacity may be reduced at a faster rate to increase delivery of motor torque to vehicle wheels. If driver demand torque increases at a lower rate, driveline disconnect clutch torque capacity may be reduced at a slower rate to reduce engine cranking time. The driveline disconnect clutch torque capacity may be reduced via reducing pressure of fluid supplied to the driveline disconnect clutch or electrical current supplied to the driveline disconnect clutch. Method 400 proceeds to 420 after driveline disconnect clutch capacity is adjusted.

At 420, method 400 judges if engine cranking time is greater than a threshold amount of time. If engine cranking time is greater than a threshold amount of time without combustion in the engine, there may be degradation of an engine component or lack of fuel. If method 400 judges that engine cranking time is greater than a threshold amount, the answer is yes and method 400 proceeds to 422. Otherwise, the answer is no and method 400 proceeds to 424.

At 422, method 400 ceases engine cranking via fully opening the driveline disconnect clutch and reducing ISG torque. The engine cranking may be resumed after a predetermined amount of time. Ceasing engine cranking may reduce driveline component degradation. Method 400 proceeds to exit after the engine ceases to be cranked.

At 424, method 400 judges if the engine is started. The engine may be judged started if engine speed is greater than cranking speed or a predetermined number of combustion events have been detected, by ion sensing or crankshaft acceleration for example. If method 400 judges that the engine is started, the answer is yes and method 400 proceeds to 426. Otherwise, the answer is no and method 400 returns to 416.

At 426, method 400 operates the engine based on the desired driver demand torque and engine speed. Further, during some conditions, the engine may be operated in a speed control mode where engine torque is adjusted to operate the engine at a desired speed, idle speed for example. Method 400 proceeds to exit after operating the engine.

In this way, driveline disconnect clutch torque capacity and motor/generator torque may be adjusted to reduce driveline losses by shortening engine cranking time. Further, up to full ISG torque may be utilized during engine cranking to reduce driveline losses and engine cranking time. Additionally, driveline disconnect clutch torque capacity may be reduced in response to increasing driver demand torque so that torque progresses smoothly from the ISG to vehicle wheels.

Thus, the method of FIG. 4 provides for an operating method for a vehicle, comprising: adjusting a torque capacity of a driveline disconnect clutch responsive to an estimated torque to rotate an engine at a desired cranking speed and an additional torque that is based on a torque converter impeller speed. The method includes where the estimated torque to rotate the engine is based on an engine temperature and barometric pressure. The method includes where the desired cranking speed is less than a speed of a motor rotating the engine. The method includes where the desired cranking speed is less than an engine idle speed. The method further comprises rotating the engine via a motor positioned in a driveline downstream of the engine. The method further comprises adjusting torque output from the motor to a maximum torque of the motor at a present motor speed.

The method of FIG. 4 also includes an operating method for a vehicle, comprising: adjusting a torque capacity of a driveline disconnect clutch responsive to an estimated torque to rotate an engine at a desired cranking speed and an additional torque that is based on a torque converter impeller speed and driveline disconnect clutch slip speed; and cranking an engine via the driveline disconnect clutch and a motor. The method includes where the torque capacity of the driveline disconnect clutch is increased as impeller speed increases. The method includes where the torque capacity of the driveline disconnect clutch is increased as impeller speed increases to a threshold speed and decreases as impeller speed increases above the threshold speed.

In some examples, the method includes where the threshold speed is a base motor speed when the motor is a DC motor. The method includes where the torque capacity of the driveline disconnect clutch increases in response to driveline disconnect clutch slip speed decreasing. The method includes where the estimated torque to rotate the engine is based on an engine temperature and barometric pressure. The method includes where the desired cranking speed is less than a speed of a motor rotating the engine. The method further comprises decreasing torque capacity of the driveline disconnect clutch in response to a first combustion event in the engine since a most recent engine stop. The method further comprises fully closing the driveline disconnect clutch in response to engine speed being within a threshold speed of motor speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, hybrid electric vehicles including engines operating in natural gas, gasoline, diesel, or alternative fuel configurations could use the present description to advantage.

The invention claimed is:

1. A vehicle operating method, comprising:
   with a controller,
   estimating a torque to rotate an engine based on a desired cranking speed;
   estimating an additional torque to rotate the engine based on a torque converter impeller speed;
   sending a signal to adjust a torque capacity of a driveline disconnect clutch responsive to the estimated torque and the additional torque; and
   sending a signal to rotate the engine via a motor positioned in a driveline downstream of the engine.

2. The method of claim 1, where the estimated torque to rotate the engine is further based on an engine temperature and barometric pressure.

3. The method of claim 1, where the desired cranking speed is less than a speed of a motor rotating the engine.

4. The method of claim 1, where the desired cranking speed is less than an engine idle speed.

5. The method of claim 1, further comprising, with the controller, sending a signal to adjust torque output from the motor to a maximum torque of the motor at a present motor speed.

6. An operating method for a vehicle, comprising:
   with a controller,
   estimating a torque to rotate an engine based on a desired cranking speed;
   estimating an additional torque to rotate the engine based on a torque converter impeller speed and a driveline disconnect clutch slip speed;
   sending a signal to adjust a torque capacity of a driveline disconnect clutch responsive to the estimated torque and the additional torque; and
   sending a signal to the driveline disconnect clutch and a motor positioned in a driveline downstream of the engine to crank the engine.

7. The method of claim 6, further comprising, with the controller, sending a signal to increase the torque capacity of the driveline disconnect clutch as impeller speed increases.

8. The method of claim 6, further comprising, with the controller, sending a signal to increase the torque capacity of the driveline disconnect clutch as impeller speed increases to a threshold speed and sending a signal to decrease the torque capacity of the driveline disconnect clutch as impeller speed increases above the threshold speed.

9. The method of claim 8, where the threshold speed is a base motor speed when the motor is a DC motor.

10. The method of claim 6, further comprising, with the controller, sending a signal to increase the torque capacity of the driveline disconnect clutch in response to the driveline disconnect clutch slip speed decreasing.

11. The method of claim 6, where the estimated torque to rotate the engine is based on an engine temperature and barometric pressure.

12. The method of claim 6, where the desired cranking speed is less than a speed of the motor rotating the engine.

13. The method of claim 6, further comprising, with the controller, sending a signal to decrease the torque capacity of the driveline disconnect clutch in response to a first combustion event in the engine since a most recent engine stop.

14. The method of claim 13, further comprising, with the controller, sending a signal to fully close the driveline disconnect clutch in response to engine speed being within a threshold speed of motor speed.

15. A driveline system, comprising:
   an engine;
   a motor/generator;
   a disconnect clutch positioned between the engine and the motor/generator; and
   a controller including executable instructions stored in non-transitory memory for supplying torque to the engine from the motor/generator via adjusting a torque capacity of the disconnect clutch responsive to a torque converter impeller speed and a driveline disconnect clutch slip speed, and the torque capacity of the disconnect clutch reduced in response to driver demand torque after being adjusted responsive to the torque converter impeller speed and the driveline disconnect clutch slip speed.

16. The system of claim 15, further comprising additional instructions to provide a minimum disconnect clutch torque capacity during engine cranking.

17. The system of claim 16, where the minimum disconnect clutch torque capacity is based on an amount of torque to rotate the engine at a desired speed.

18. The system of claim 15, where the engine is started via supplying torque to the engine from the motor/generator.

19. The system of claim 15, further comprising additional instructions to adjust the torque capacity of the disconnect clutch responsive to an estimated torque to rotate the engine at a desired cranking speed.

* * * * *